United States Patent [19]

Lippai et al.

[11] Patent Number: 5,588,351
[45] Date of Patent: Dec. 31, 1996

[54] HEAD FOR TWO PIECE ARTICULATED PISTON

[75] Inventors: Andre Lippai; Jorge K. Tanigami, both of Sao Paulo; Paulo T. Dellanoce, Sao Caetano do Sul, all of Brazil

[73] Assignee: Metal Leve S/A Industria E Comercio, Sao Paulo, Brazil

[21] Appl. No.: 331,176

[22] Filed: Oct. 28, 1994

Related U.S. Application Data

[60] Continuation of Ser. No. 34,091, Mar. 22, 1993, abandoned, which is a division of Ser. No. 767,047, Sep. 27, 1991, Pat. No. 5,245,752.

[30] Foreign Application Priority Data

Sep. 28, 1990 [BR] Brazil ...................... 9004990

[51] Int. Cl.$^6$ .................. F16J 1/04; F02F 7/00
[52] U.S. Cl. .................. 92/208; 92/255; 92/260; 123/193.6
[58] Field of Search .................. 92/181 K, 255, 92/207, 231, 260, 187, 192, 208; 123/193.6; 29/888.04, 888.042, 888.044

[56] References Cited

U.S. PATENT DOCUMENTS

| | | | |
|---|---|---|---|
| 3,613,521 | 10/1971 | Itano | 92/231 X |
| 3,943,908 | 3/1976 | Kubis et al. | 123/193.6 X |
| 4,180,027 | 12/1979 | Taylor | 123/193.6 X |
| 4,530,341 | 7/1985 | Palm | 123/193.6 X |
| 4,581,983 | 4/1986 | Moebus | 92/231 X |
| 4,781,159 | 11/1988 | Elsbett et al. | 123/193.6 X |
| 4,831,917 | 5/1989 | Houben et al. | 123/193.6 X |
| 4,838,149 | 6/1989 | Donnison et al. | 123/193.6 X |
| 4,843,698 | 7/1989 | Ripberger et al. | |
| 4,847,964 | 7/1989 | Adams et al. | 29/888.042 X |
| 5,065,706 | 11/1991 | Zvonkovic | 123/193.6 X |
| 5,081,968 | 1/1992 | Bruni | 123/193.6 X |
| 5,144,923 | 9/1992 | Leites et al. | |
| 5,150,517 | 9/1992 | Leites et al. | 29/888.042 X |

*Primary Examiner*—Hoang Nguyen
*Attorney, Agent, or Firm*—Darby & Darby, P.C.

[57] ABSTRACT

A two-piece, or articulated, piston head for internal combustion engines having top and pin boss portions in which the underside of the top portion is provided with a groove whose inner wall is eccentric in relation to the longitudinal axis; of the top and the upper side of the top portion is provided with a combustion bowl eccentric in relation to the top portion longitudinal axis and concentric with the inner wall of the groove on the underside of the top portion.

13 Claims, 1 Drawing Sheet

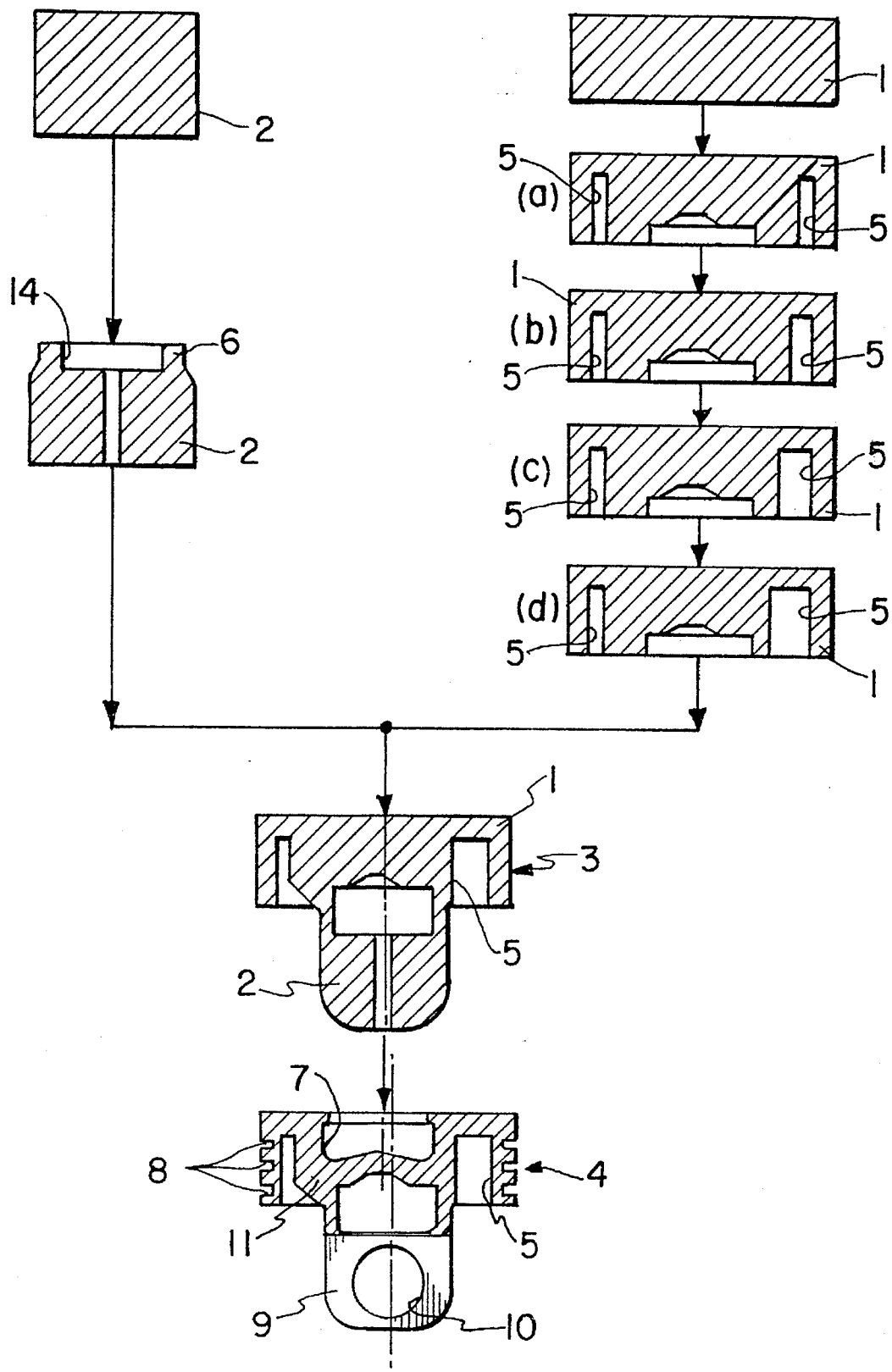

HEAD FOR TWO PIECE ARTICULATED PISTON

This is a continuation of application Ser. No. 08/034,091, filed Mar. 22, 1993, now abandoned which is a divisional of application Ser. No. 7/767,047 filed Sep. 27, 1991, now U.S. Pat. No. 5,245,752.

BACKGROUND OF THE INVENTION

The present invention relates to a two-piece piston, also known as articulated piston, for use in internal combustion engines.

The current trend points to an increasing use of articulated pistons in internal combustion engines, especially in the modern diesel engines which run at high speeds and deliver a high specific output, at the same time that their design is addressed to meet such requirements as low weight, low fuel and lubricating oil consumption, and lower noise and emission levels, these the latter to satisfy the object of more and more stringent laws in many countries. In the articulated piston the upper portion, or head, and the lower portion, or skirt, perform independent functions. The skirt is mounted by means of a wrist pin on a pair of pin bosses located at the lower end of pin boss members depending from and integral with the head. A gap, or clearance, is maintained between the head lower end and the skirt upper end so that with the piston fitted in the engine there is no contact between the head and the skirt, thus preventing the flow of heat from the head to the skirt, thereby allowing the skirt to be mounted with very small skirt-to-cylinder clearances, which brings about a reduction of noise. Moreover, the lateral, or rocking, motion of the articulated piston caused by the connecting rod is reduced. Therefore, the portion of the head provided with the ring grooves can be fitted with small clearances, thereby improving the piston ring stability. This in turn will reduce lubricating oil consumption and minimize blowby.

Owing to the high temperatures generated on the piston top during the combustion process in diesel engines, it is necessary to remove part of the heat from a portion of the piston, especially from the combustion bowl, in order to prevent the formation of thermal cracks which may cause fracture of the top. One well known solution for this problem is to provide the piston with a chamber in which cooling oil circulates. In the articulated pistons this chamber is composed of a circumferential recess, or groove, on the head and a tray on the top of the skirt. The cooling medium is supplied to the chamber by means of a nozzle located at the engine crankcase. The reciprocating travel of the piston causes the cooling oil to splash against the chamber wall, thereby removing part of the heat from the top, especially around the combustion bowl.

There is a basic technical principle on diesel engines under which provides that the center of the combustion bowl on the piston top must be in alignment with the fuel injection nozzle so as to meet combustion efficiency requirements. Thus, the location of the fuel injection nozzle in certain engine designs requires that the combustion bowl be offset from the piston top centerline. In such cases, it is necessary to design the cooling chamber in such a manner as to ensure an effective cooling, i.e., the thickness of the chamber inner wall, which separates the chamber from the combustion bowl, must be as reduced and made as uniform as possible. This requires the cooling chamber to be asymmetric in relation to the piston longitudinal axis.

In conventional articulated piston heads, in which the top and pin boss portions are an integral part, the provision of an asymmetric groove on the lower portion is possible only when the part is obtained by casting. However, the casting method has proved inappropriate for making heads having structural properties consistent with the loads imposed on them. For this reason, at present there is a clear preference for heads made by the forging method. Head made by this method, however, have a drawback: it is not possible to provide the head top lower portion with a groove during the forging operation, thus the groove must be made by machining, and then only if it is an axisymmetric chamber. An asymmetric chamber would be unfeasible due to process limitations, as it is impossible for the machining tool to access the region to be machined.

The present invention relates to a head for an articulated piston whose top portion and pin boss portion, are made separately and then joined together by welding. Said concept is disclosed in Brazilian patent application 8805716.

BRIEF DESCRIPTION OF THE INVENTION

Based on that concept, the present invention relates to a piston head with an asymmetric groove on the lower portion of the top of the articulated piston head. According to the present invention, the portions composing the head of an articulated piston, i.e., the top and the pin bosses, are made separately. An asymmetric groove is machined on the lower face of the top and portion afterwards, the top portion is joined to the pin bosses by welding.

OBJECTS OF THE INVENTION

It is, therefore, one object of the present invention to provide an articulated piston head in which the lower face of the top portion is provided with a machined peripheral groove asymmetric in relation to the head longitudinal axis.

It is a further object of the present invention to have an articulated piston head provided with a combustion bowl located asymmetrical in relation to the head longitudinal axis, the lower face of the head top portion being provided with a peripheral groove asymmetrical to the head longitudinal axis.

BRIEF DESCRIPTION OF THE DRAWINGS

The product invention a process for making are illustrated schematically in the accompanying drawing, to which a description of a preferred embodiment will refer.

DETAILED DESCRIPTION OF THE INVENTION

According to the present invention, the figure showing the parts in cross section, to make the head a first substantially cylindrical blank 1 is placed and secured to a machining device (not shown) and subjected to a first machining operation to provide an axisymmetric peripheral circumferential groove 5 on the underside, i.e., lower face of the first blank 1 (step "a"). Thereafter, the first blank 1 secured to said machining device is displaced from its longitudinal axis and subjected to a second machining operation during which, owing to the eccentric position of member 1 in relation to the cutting tool, additional stock from only one part of the groove 5 is removed in the direction of the axis of member 1 (step "b"). If required, additional machining operations can be performed (according to steps "c" and "d"), always with an additional displacement of the center of member 1 from its longitudinal axis until the desired configuration of groove 5 is obtained.

Under separate operations, a second blank 2 is subjected to machining, one of its ends being provided with a central recess 14 and, adjacent the recess, with a narrowing of the periphery of said end thereby defining a rib 6.

Thereafter, members 1 and 2 are joined together by means of welding by juxtaposing rib 6 to the lower central surface of the first member 1, thereby forming the rough head 3 of a two-piece piston. The rough head 3 is then subjected to the last machining operations for the provision of the combustion bowl 7, ring grooves 8, wrist pin bosses 9 and wrist pin holes 10, thus defining the finished head 4.

In this final form, one may notice the combustion bowl 7 located offset the longitudinal axis of head 4, as well as the annular rib 11 between the combustion bowl 7 and the recess 5 having a substantially uniform thickness, which ensures an optimization of heat removal from said region.

Further, it should be considered that the smaller width of the asymmetric groove 5 imposes a width limitation to the cutting tool, thus the greater the amount of asymmetry desired, the greater the number of machining operations required to obtain the asymmetric groove.

After machining of the combustion bowl on the head top portion, the inner wall of groove 5 will be concentric with the combustion bowl and define with the combustion bowl wall an annular rib having a reduced and uniform thickness, a feature beneficial to an effective and uniform cooling of that portion of the piston head.

The preferred method for joining together the two members composing the piston head is the friction welding method which carries out the joining without causing the melting of the material of either of the members to be welded. The advantage of the friction welding method lies in the absence of shrinkage porosities as there is no formation of liquid phases during the welding process, which in turn prevents structural changes to the material of the members welded to each other. However, other processes can be employed to perform this welding such as metal inert gas welding (MIG), tungsten insert gas welding (TIG), fusion welding, electrode welding, electron beam welding or laser welding.

The embodiment described and illustrated is a preferred one but not restrictive, therefore it should be appreciated that other embodiments are possible within the spirit and scope of the invention. Thus, for instance, the second blank 2 can be a cast, forged or even sintered member already in its final shape for joining to member 1, whereby the machining operations for the provision of the recess and the rib on member 2 can be dispensed with.

What is claimed is:

1. A head as one piece of a two piece oil cooled piston to which a separate skirt is to be attached as the second piece to form the two piece piston for internal combustion engines comprising:

a substantially cylindrical first monolithic metallic blank having on its lower face a machined circumferential groove for receiving oil as a cooling chamber, said circumferential groove being of variable width with an outer wall which is axially symmetric and an inner wall which is axially asymmetric with the blank longitudinal axis, said first blank having on its upper face a recessed combustion bowl axially offset of the first blank longitudinal axis and concentric with the inner wall of said circumferential groove, and an originally separate substantially cylindrical second blank of the same material as said first blank having an annular rib on one face joined to the part of the lower face of the first blank interior of said circumferential groove inner wall to complete the head and leaving access to said circumferential groove.

2. A head for an oil cooled piston as in claim 1 wherein said second blank upper face is welded to the first blank lower face.

3. A head for an oil cooled piston as in claim 2 further comprising pin bosses extending from the lower face of said second blank for attachment of the separate skirt to form the two piece piston.

4. A head for an oil cooled piston as in claim 1 wherein said second blank has on its upper face a machined central recess concentric with said first blank longitudinal axis and a narrowed outer diameter forming an annular rib.

5. A head for an oil cooled piston as in claim 4 wherein said second blank annular rib is welded to said first blank lower face inwardly of said first blank circumferential groove.

6. A head for an oil cooled piston as in claim 5 further comprising pin bosses extending from the lower face of said second blank for attachment of a separate skirt.

7. A head for an oil cooled piston as in claim 1 wherein a lower part of the inner wall defining the circumferential groove and an upper part of the outer edge of the second blank defining the central recess are formed to define a surrounding rib of substantially uniform thickness.

8. A head for an oil cooled piston as in claim 1 wherein the outer surface of said first blank has at least one circumferential ring groove.

9. A head for an oil cooled piston as in claim 4 wherein said first blank lower face has a central recess interior of its circumferential groove inner wall defining a rib therebetween, said first and second blanks being joined at the lower end of said rib of said first blank and the upper end of the rib of said second blank with the central recess on the upper face of said second blank being in alignment with the central recess on the lower face of said first blank.

10. A head for an oil cooled piston as in claim 9 wherein said first blank has at least one circumferential ring groove on its outer surface.

11. A head for an oil cooled piston as in claim 1 wherein said first and second blanks are of steel.

12. A head for an oil cooled piston as in claim 1 wherein said first and second blanks are of ferrous material.

13. A head for an oil cooled piston as in claim 1 wherein said second blank is joined only to the part of the lower face of said first blank interior of said circumferential groove inner wall.

* * * * *